May 25, 1965 — L. F. URRY — 3,185,594
LEAK-RESISTANT DRY CELL
Original Filed May 1, 1961
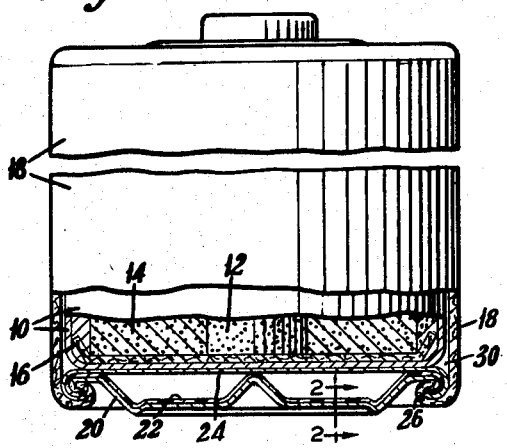
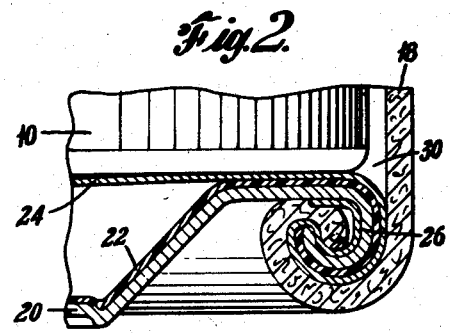
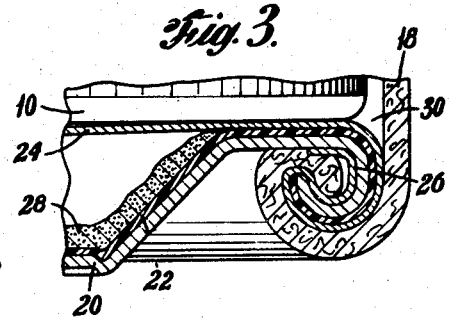
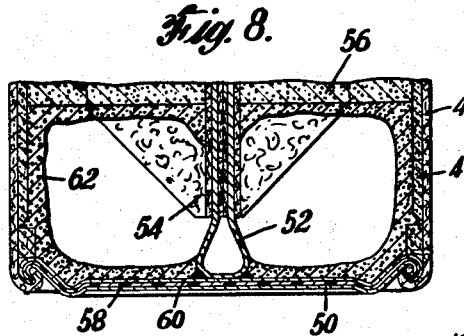
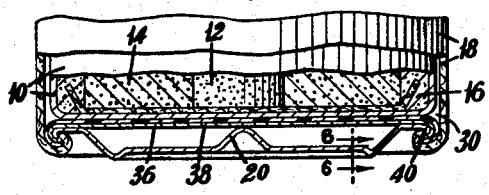
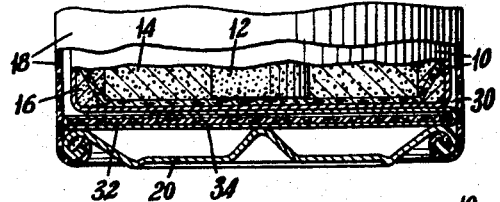
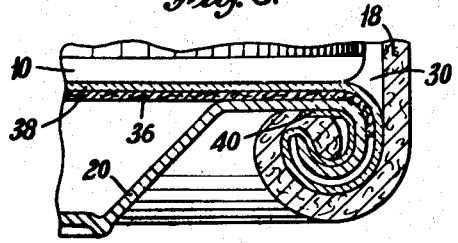
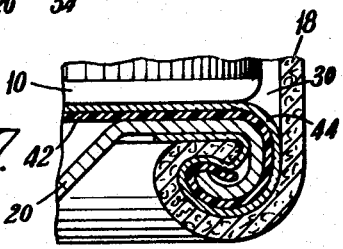
INVENTOR.
LEWIS F. URRY
BY *John R. Hoberty*
ATTORNEY

United States Patent Office 3,185,594
Patented May 25, 1965

3,185,594
LEAK-RESISTANT DRY CELL
Lewis F. Urry, Cleveland, Ohio, assignor to Union Carbide Corporation, a corporation of New York
Original application May 1, 1961, Ser. No. 106,761, now Patent No. 3,115,428, dated Dec. 24, 1963. Divided and this application Nov. 1, 1963, Ser. No. 320,691
3 Claims. (Cl. 136—107)

This invention relates to leak-resistant dry cells of the type having a closed container surrounding the cell proper.

The so-called Leclanché dry cell used for flashlights, portable radios, photoflash and other devices has gone through an evolution of improvements during the past decade or more in an attempt by manufacturers to prevent leakage from the cell during and after its use. Despite the many proposals, however, that have been advanced, there still remains a need for a better leak-resistant dry cell.

One proposal that has been adopted commercially is to encase a conventional dry cell within a closed container comprising a non-corrodible jacket, a "false" bottom, and a top closure. The bottom of the cell container has been used for making electrical contact with the metal electrode of the cell, and for this purpose has been made of metal, for instance, steel. This construction, however, suffers from the disadvantage that the metal bottom is subject to being corroded and eventually perforated by liquid exudate from the cell. One suggestion that has been advanced is to make the container bottom of a non-corrodible metal. Such proposals, however, have not been practical, for they greatly increase the cost of manufacture of the cell. Other proposals have been made for protecting the bottom of the cell container from contact by liquid exudate, but those proposals thus far advanced have proven unsuitable because they defeat the purpose of the container bottom to make electrical contact with the metal electrode of the cell.

It is therefore the principal object of the invention to effectively protect the container bottom of a leak-resistant dry cell from corrosion, but without interference with the purpose of the container bottom to make electrical contact with the metal electrode of the cell.

Briefly, the above and other objects are achieved by the invention which comprises a shield for the container bottom of a leak-resistant dry cell and an electrically conductive strip of foil positioned in electrical contact between the container bottom and the metal electrode of the cell.

In the accompanying drawing:

FIG. 1 is a vertical elevation partially in section of a leak-resistant dry cell embodying the invention;

FIG. 2 is an enlarged detail view taken along the line 2—2 of FIG. 1;

FIG. 3 is similar to FIG. 2 showing another embodiment of the invention;

FIG. 4 is a vertical elevation partially in section of the bottom portion only of a dry cell showing still another embodiment;

FIG. 5 is similar to FIG. 4 showing yet another embodiment;

FIG. 6 is an enlarged detail view taken along the line 6—6 of FIG. 5;

FIG. 7 is similar to FIG. 6 showing a further embodiment; and

FIG. 8 is a vertical section of the bottom portion only of another dry cell construction embodying the invention.

Referring to the drawing and particularly to FIG. 1, a dry cell of a conventional construction comprising a cupped container-anode 10 of a consumable metal, for instance, zinc having therein a carbon electrode 12 embedded within a depolarizer mix 14 and an immobilized electrolyte 16 suitably in the form of a conventional "paste," is provided with a jacket 18 having locked thereto a metallic bottom plate 20. At the bottom of the cell and so placed as to define a barrier against contact of liquid exudate with the bottom plate 20 is a shield comprising a coating 22 of a liquid-repellant material applied to the inner surfaces of the bottom plate 20. A foil strip 24 is positioned beneath and in contact with the container-anode 10, and is curled and locked in contact with the bottom plate 20 as indicated at 26 in enlarged detail in FIG. 2. The bottom plate 20 is indented at its center and secures the strip 24 in contact with the bottom of the container-anode 10. The strip 24 may also be welded or soldered in place if desired. As shown in FIG. 3, a seal 28 of wax, for example, may be applied around the locked junction of the plate 20 and jacket 18 to further protect against leakage. This construction provides a good liquid-tight closure for the cell without depending as much upon the mechanical tightness of the locked junction. The coating 22 may be composed of a vinyl resin paint or lacquer, for example, although any suitable liquid-repellant material may be used, and is preferably applied to the whole inner surface of the bottom plate 20, for instance by spraying it on, including its peripheral edges which are locked to the jacket 18. The foil strip 24 may be made from most any metallic foil, aluminum foil being an example.

The top closure for the cell is of a conventional construction locked to the jacket 18. The jacket 18 is non-corrodible, it being composed of a fibrous material, for example, paper, and fits the container-anode 10 rather loosely, thereby providing a supplementary chamber 30 for receiving liquid exudate from the cell.

As shown in FIGS. 4 to 8 inclusive, the principles of the invention may be achieved in a number of ways and are applicable to a variety of dry cells. For instance, referring to FIG. 4, the shield may be a disc 32 of a diameter sufficient to be fitted tightly within the lower edges of the jacket 18 between the container-anode 10 and the bottom plate 20. A foil strip 34 is wrapped around the disc 32 and contacts both the container-anode 10 and the bottom plate 20 at its indented center beneath the disc 32. Or, as shown in FIG. 5, a larger diameter disc 36 may be used, the peripheral edges of which are curled over and secured in the locked junction of the bottom plate 20 and the jacket 18. In this construction, a foil strip 38 is locked in contact with the bottom plate 20 as indicated at 40 in enlarged detail in FIG. 6. This latter construction provides for a seal within the locked junction somewhat the same as that shown in FIG. 3, for instance. Both of the discs 32, 36 may be composed of paper or other fibrous material impregnated with wax, for example, to render the discs non-absorbent. Preferably, during manufacture of the dry cells, the bottom plates 20 after assembly are heated to cause some of the wax from around the peripheral edges of the discs 32, 36 to soak into the inner surfaces of the jacket 18. When the wax hardens in situ, a good liquid-tight seal is achieved.

A modification of the constructions just described is shown in FIG. 7. In the modification, a cup 42 fits over and is curled around the peripheral edges of the bottom plate 20, the cup 42 being composed of a resilient material, preferably a plastic such as polyethylene. A foil strip 44 is also locked in contact with the bottom plate 20 similarly as shown in FIG. 6. Although not shown, the edges of the bottom plate 20 may be capped with soft copper, for example, to prevent them from cutting through the cup 42. This construction provides a closure for a dry cell which is self-sealing in the unlikely event the foil strip should be totally consumed or corroded away by liquid exudate from the cell. The cup 42 being resilient is thus capable of sealing off any space left behind by the foil strip in the locked junction, thereby preventing leakage from the bottom of the cell container.

A different version of a dry cell embodying the invention is shown in FIG. 8. The dry cell which is shown is substantially disclosed and claimed in U.S. Patent No. 2,605,299 issued to J. P. Teas on July 29, 1952, and comprises a container-electrode 46 of carbon molded in juxtaposition to and in adherent contact with the inner surfaces of a non-corrodible jacket 48 suitably of paper having a metallic bottom plate 50 locked thereto, the electrode 46 being suitably molded within the jacket 48 by injection molding techniques. A consumable metal electrode 52 having a generally X shaped cross section and provided with a conventional separator 54 of a bibulous paper is embedded wtihin a depolarizer mix 56 which substantially fills the container-electrode 46. A shield comprising a coating 58 of a vinyl resin paint or lacquer, for example, is applied over the inner surfaces of the bottom plate 50. A foil strip 60 is positioned in contact with the stem of the metal electrode 52 and makes contact with the bottom plate 50 in its locked engagement with the jacket 48 as in the constructions previously described. A seal 62 preferably of wax is applied over the depolarizer mix 56 and overlies the bottom plate 50.

An important feature of the invention is the utilization of the foil strip in the various constructions described as a fuse-like element adapted to be consumed in the event liquid exudate collects within the bottom of the cell container, thereby breaking electrical contact with the bottom plate and rendering the cell dead. Thus, the difficulties brought about by over-discharging the cell after its useful life has been expanded, for example that of gas being generated, are avoided. The foil strip for this purpose may be made from a variety of consumable or anodic metal foils, such as zinc (unamalgamated), magnesium and aluminum foils, for example.

Another advantage derived from the invention is the elimination of cell exudate as a factor which has contributed towards the formation of gas and the build up of gas pressure within the cell container. In prior dry cell constructions, liquid exudate from the cell has been permitted to contact both the metal electrode and container bottom of the cell, which being of different metals constitute an electrolytic couple which caused gas to be generated. The present construction avoids this difficulty by the interposition of a shield between the electrode and the container bottom.

A number of dry cells embodying the invention have been made and tested under severe conditions. These tests proved the effectiveness of the invention for good electrical contact with the bottom of the cell container was maintained and no evidence of corrosion or perforation of the container bottom was observed during the tests.

It will be understood that many changes and modifications of the dry cell constructions described herein may be made without departing from the spirit and scope of the invention.

This application is a division of application Serial No. 106,761, filed May 1, 1961, now United States Patent No. 3,115,428, issued on December 24, 1963.

What is claimed is:

1. In a leak-resistant dry cell comprising a jacket, a container-electrode of carbon in juxtaposition to and in adherent contact with said jacket having therein a depolarizer mix and a second electrode of a consumable metal embedded within said depolarizer mix, and a metallic bottom plate locked to said jacket, the combination of a shield for said bottom plate and an electrically conductive strip positioned in contact with said second electrode and making electrical contact with said bottom plate in the locked junction of said bottom plate and said jacket.

2. A leak-resistant dry cell as defined by claim 1 in which said shield comprises a coating on said bottom plate of a liquid-repellant material.

3. A leak-resistant dry cell as defined by claim 1 in which said liquid-repellant material is a vinyl resin composition.

References Cited by the Examiner
UNITED STATES PATENTS

| | | | |
|---|---|---|---|
| 2,707,200 | 4/55 | Urry et al. | 136—133 |
| 2,807,658 | 9/57 | Hatfield | 136—134 |
| 2,859,265 | 11/58 | George | 136—133 |

JOHN H. MACK, *Primary Examiner.*